(12) United States Patent
Satz

(10) Patent No.: US 6,874,848 B2
(45) Date of Patent: Apr. 5, 2005

(54) LAMELLAR VEHICLE ROOF

(75) Inventor: Wolfram Satz, Vaihingen/Enz (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/683,414

(22) Filed: Oct. 10, 2003

(65) Prior Publication Data

US 2004/0075303 A1 Apr. 22, 2004

Related U.S. Application Data

(63) Continuation-in-part of application No. PCT/EP02/04032, filed on Apr. 11, 2002.

(30) Foreign Application Priority Data

Apr. 20, 2001 (DE) .......................... 101 19 667

(51) Int. Cl.[7] ................................................ B60J 7/047
(52) U.S. Cl. ................................................ 296/220.01
(58) Field of Search ............................ 296/217, 220.01

(56) References Cited

U.S. PATENT DOCUMENTS 5,836,642 A   11/1998  Salz
5,897,160 A * 4/1999  Reihl et al. ............ 296/220.01
6,502,898 B1 * 1/2003  Salz ...................... 296/220.01

FOREIGN PATENT DOCUMENTS

| DE | 195 29 702 | 9/1996 |
| DE | 198 35 535 | 10/1999 |
| DE | 199 27 654 | 7/2000 |

* cited by examiner

Primary Examiner—Dennis H. Pedder
(74) Attorney, Agent, or Firm—Klaus J. Bach

(57) ABSTRACT

In a lamellar roof for a roof opening of a vehicle, wherein the roof comprises a number of roof sections (lamellas) supported on guide carriages, which are movable along guide tracks mounted along opposite sides of the roof opening for opening and closing the roof, a lamella guide mechanism is provided including lamella carriers pivotally supported on the guide carriages together with support levers such that overlapping areas of the support levers of adjacent guide carriages are firmly in engagement with each other when the roof is open and the guide carriages are in an abutting relationship.

9 Claims, 6 Drawing Sheets

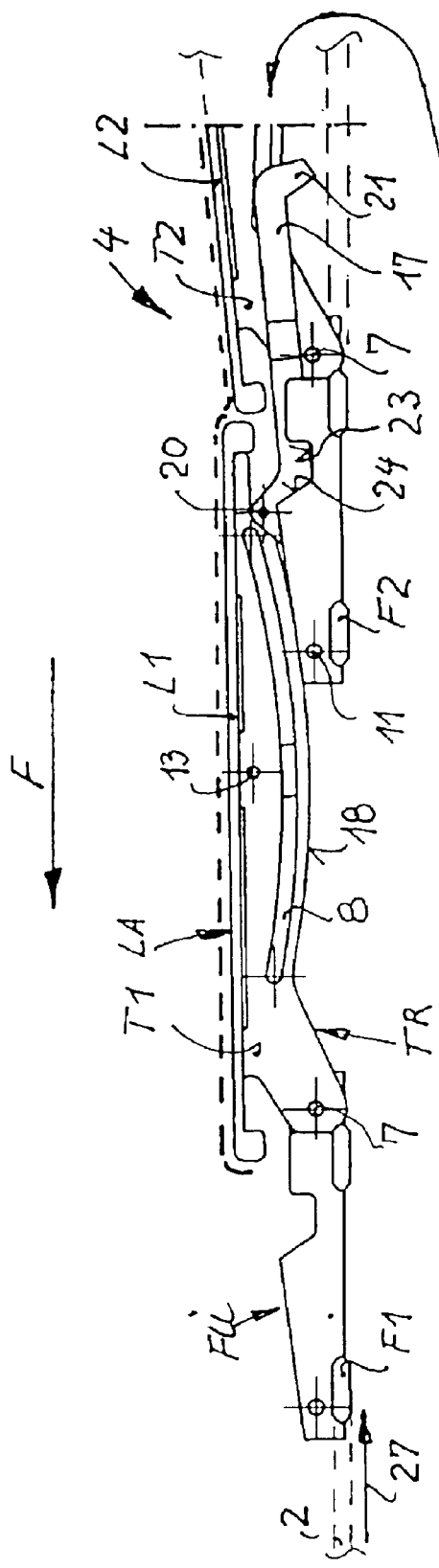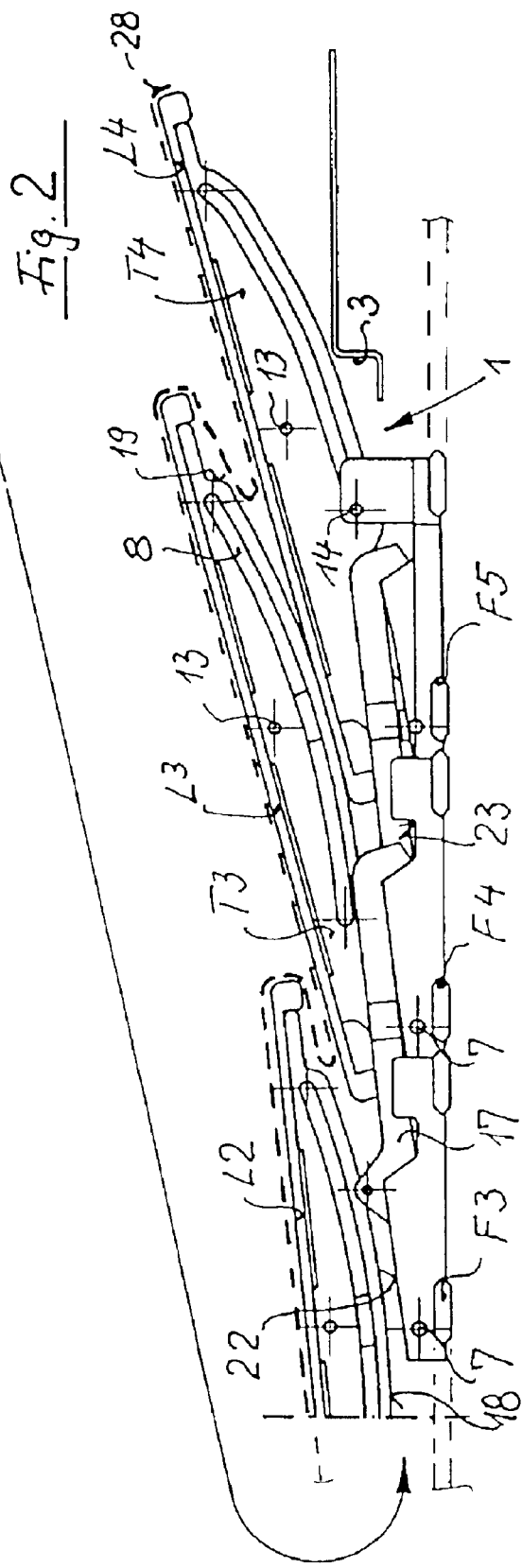
Fig. 2

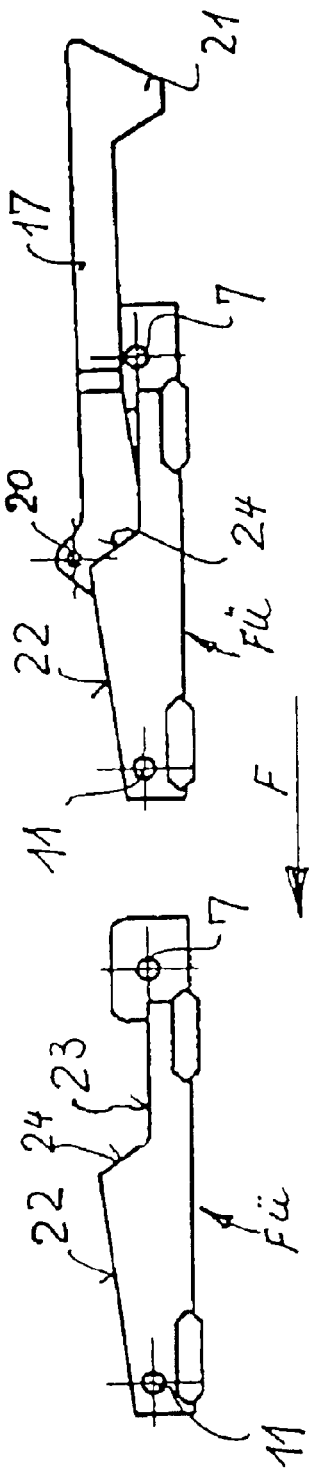
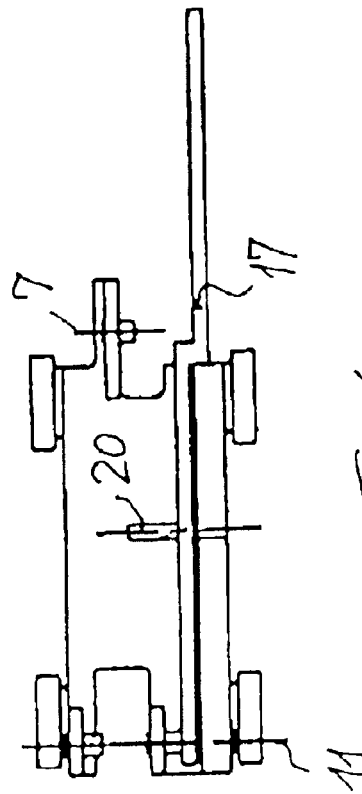
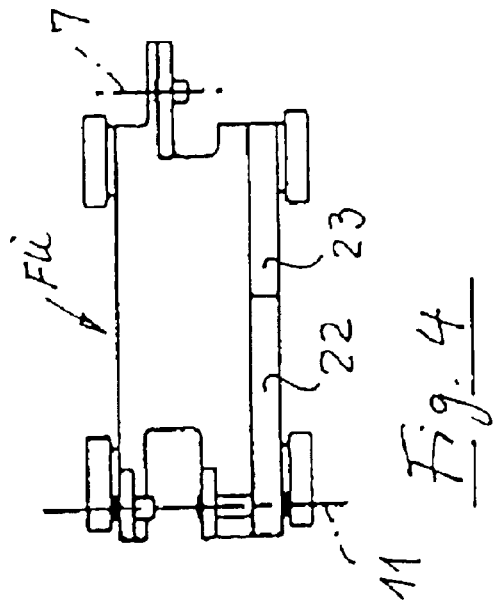

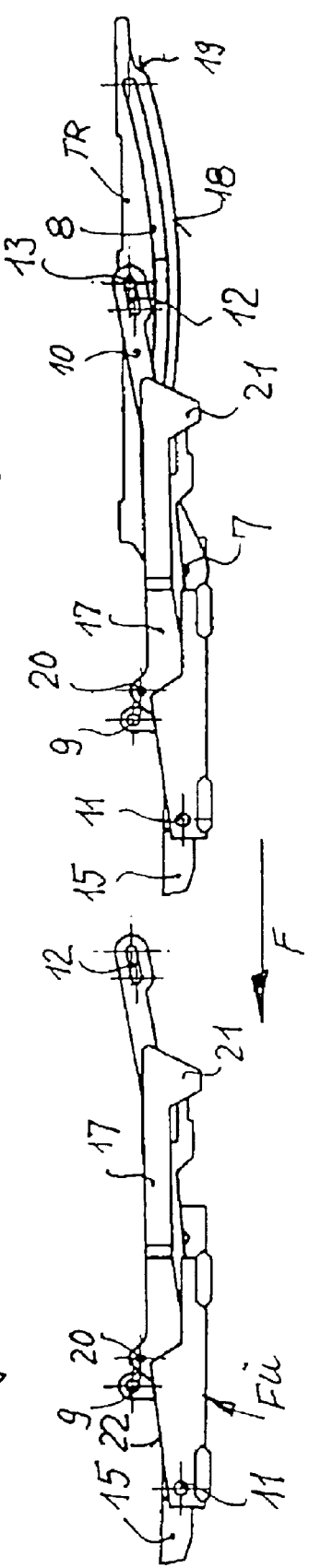

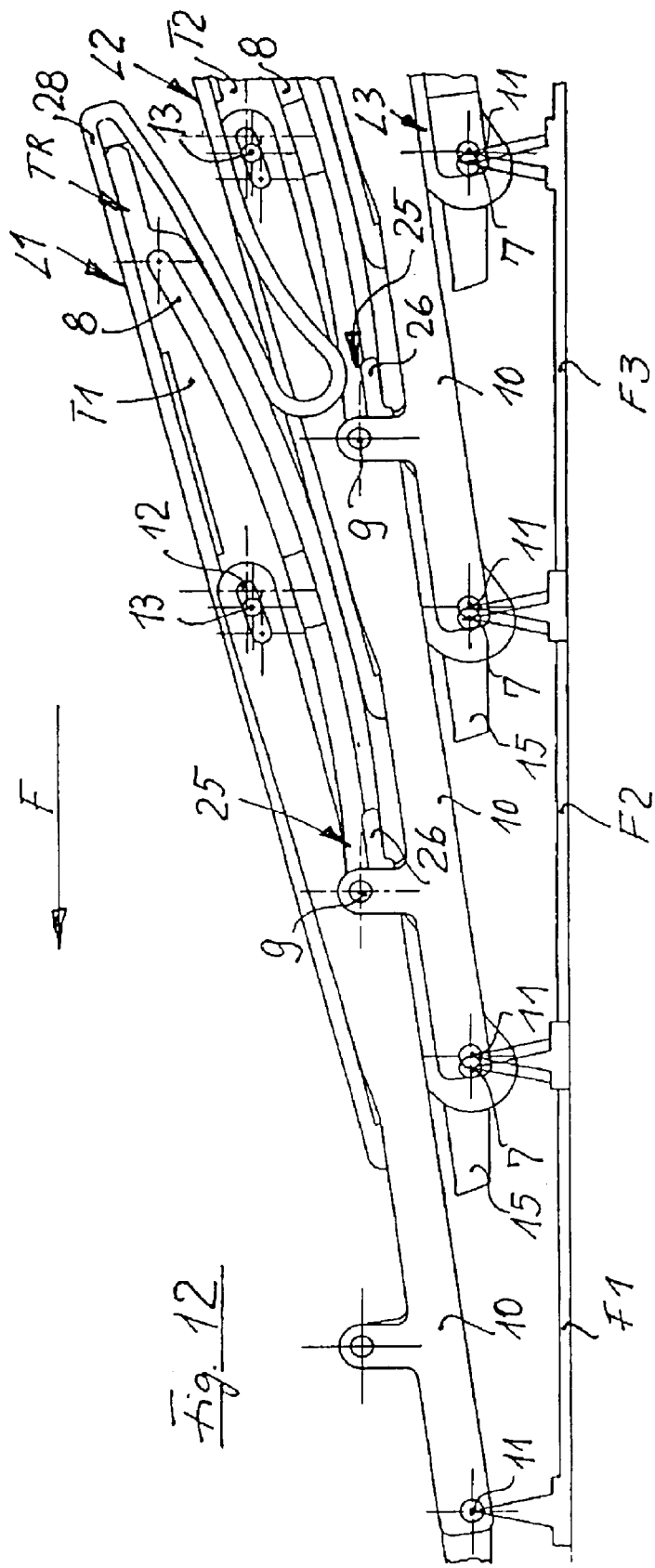

LAMELLAR VEHICLE ROOF

This is a Continuation-in-Part application of international application PCT/EP02/04032 filed Apr. 11, 2002 and claiming the priority of German application 101 19 667.9 filed Apr. 20, 2001.

BACKGROUND OF THE INVENTION

The present invention relates to a lamellar roof for a roof opening of a motor vehicle including at least two lamella sections, which are mounted in the roof opening and which are supported on tracks extending along the roof opening such that the lamella sections are movable between a closed position in which they cover the roof opening and an open position in which they are tilted upwardly and moved backwardly into a sandwiched position essentially out of the roof opening.

Such a lamellar roof is known for example from DE 199 24 654 C1. The roof lamellas are supported by a guide track mechanism arranged in a roof opening such that the lamellas are movable between a closed position in which they cover the roof opening and an open position. In the open position, the lamellas are moved on top of one another out of the roof opening. The operating mechanism by way of which the lamellas are supported on the guide rail comprises lamella carriers and guide carriages to which the lamella carriers are connected by support levers and by way of which the lamellas can be moved relative to each other or locked in position. In each case, at least one support lever carrying a lamella is supported on a guide carriage. As support levers, control rockers as well as locking levers are provided. The individual lamellas are supported or, respectively, locked in position by the support levers for the respective lamella. Among each other the lamellas are coupled in such a way that the support levers in the form of control rockers control the tilt-up movement of adjacent lamellas. This is achieved in that the control rocker of a guide carriage supports one lamella and a locking lever pivotally connected to the control rocker locks the guide carriage supporting the control rocker relative to the adjacent guide carriage when the lamellas are moved to their open positions in which they are stacked on top of one another.

With this solution, basically, each lamella is supported on two adjacent guide carriages which are interconnected when the lamellas are in their open upwardly tilted positions, wherein the support lever forming for a particular lamella a support rocker and the locking lever provide for firm support. Such a support arrangement is necessary for a lamella roof to provide a play-free stability for the lamella roof also in its open position but which is difficult to control.

It is therefore the object of the present invention to provide a lamella roof in which the lamellas are firmly supported in the open position of the roof without the need for additional structural reinforcement components.

SUMMARY OF THE INVENTION

In a lamellar roof for a roof opening of a vehicle, wherein the roof comprises a number of roof sections (lamellas) supported on guide carriages, which are movable along guide tracks mounted along opposite sides of the roof opening for opening and closing the roof, a lamella guide mechanism is provided including lamella carriers pivotally supported on the guide carriages together with support levers such that overlapping areas of the support levers of adjacent guide carriages are firmly in engagement with each other when the roof is open and the guide carriages are in an abutting relationship.

In this way, the support levers form, with respect to adjacent lamellas, a support structure providing various possibilities. For example, the engagement point between support levers of adjacent guide carriages can be so selected that, with respect to the individual lamellas, shorter support lengths are obtained. Furthermore, the support structure may be rigged in such a way that play, which, because of manufacturing tolerances, is practically always present and which may cause noises, is eliminated. In addition, the engagement structure according to the invention is also suitable for the accommodation of load peaks as they may occur as a result of wind forces particularly with lamellar roofs which are provided with a flexible material cover.

It is particularly expedient to use as support levers control rockers which support the, in driving direction, adjacent front lamella. In accordance with the invention, the control rocker is connected to the supported front lamella by way of a guide slot extending along the lamella carrier thereof.

If in such an arrangement the pivot axis of the control rocker is displaced in travel direction with respect to the pivot axis of the rear lamella supported by the same guide carriage, the control rocker and the lamella carrier, which are supported by the same guide carriage, can be made equally long so that, with the guide carriages moved into engagement with one another and the lamellas tilted upwardly, the control rockers are in an overlapping position and the overlapping areas may be in engagement with one another for improved stability.

In a particularly expedient embodiment, the support pin, by way of which the respective control rocker engages the guide slot of the lamella carrier or into which it projects, is employed as a coupling element between the guide rockers to be interconnected or, respectively, as a support element if no interconnection is desired but only abutting engagement of the control rockers and the associated components is desired for example for the elimination of manufacturing tolerances.

In connection with the invention also the locking levers for the locking of adjacent guide carriages, which have been moved into engagement, may be used as support levers and the locking levers may be biased toward the support structure for the lamellas and also, toward the guide track in order to increase the rigidity of the lamella structure in the open position thereof.

A particularly advantageous is an embodiment of the invention wherein for lamellar roof designs, in which the lamella is supported at the rear end of the respective guide carriage and the support lever, which is oriented in the same direction as the lamella and is in the form of a control rocker, is supported at the front end of the guide carriage, particularly when the control rocker and the support lever are supported co-axially so that overlapping areas for the control rocker as well as the support lever are formed which are suitable for forming engagement areas.

Further details and features of the invention will become more readily apparent from the following description thereof on the basis of the accompanying drawings.

BRIEF DESCRIPTION OF THE DRAWINGS

FIG. 1 shows schematically, with a partially opened lamellar roof, the right side lamella support structure with the guide carriages in the guide tracks as seen from the center of the vehicle.

FIG. 2 is a representation corresponding to that of FIG. 1 but showing the lamella support structure from the opposite side, that is from the outside wherein, for clarity reasons, the control rockers disposed between the lamella carriers and the locking levers are not shown.

FIGS. 3 and 4 show schematically a guide carriage in side and respectively, top views, FIGS. 5 and 6 show the guide carriages of FIGS. 3 and 4 in side and, respectively, top views with a locking element in the form of a locking lever supported thereon, FIGS. 7 and 8 show a guide carriage as shown in FIGS. 3 and 4 in side and, respectively, top views with a locking element and a control rocker supported thereon and used as support levers.

FIGS. 9 and 10 show a guide carriage as shown in FIGS. 3, 5 and 7 and 4, 6 and 8, wherein additionally a lamella carrier is shown which is pivotally supported by the respective guide carriage.

FIG. 12 shows a lamella roof with the front part open and the guide carriages moved back into abutting relationship and the lamellas tilted upwardly and stacked wherein, for clearer representation, like in FIG. 2, the foreground components of the guide structure, particularly the locking elements are not shown.

DETAILED DESCRIPTION OF AN EMBODIMENT OF THE INVENTION

Figure 1:
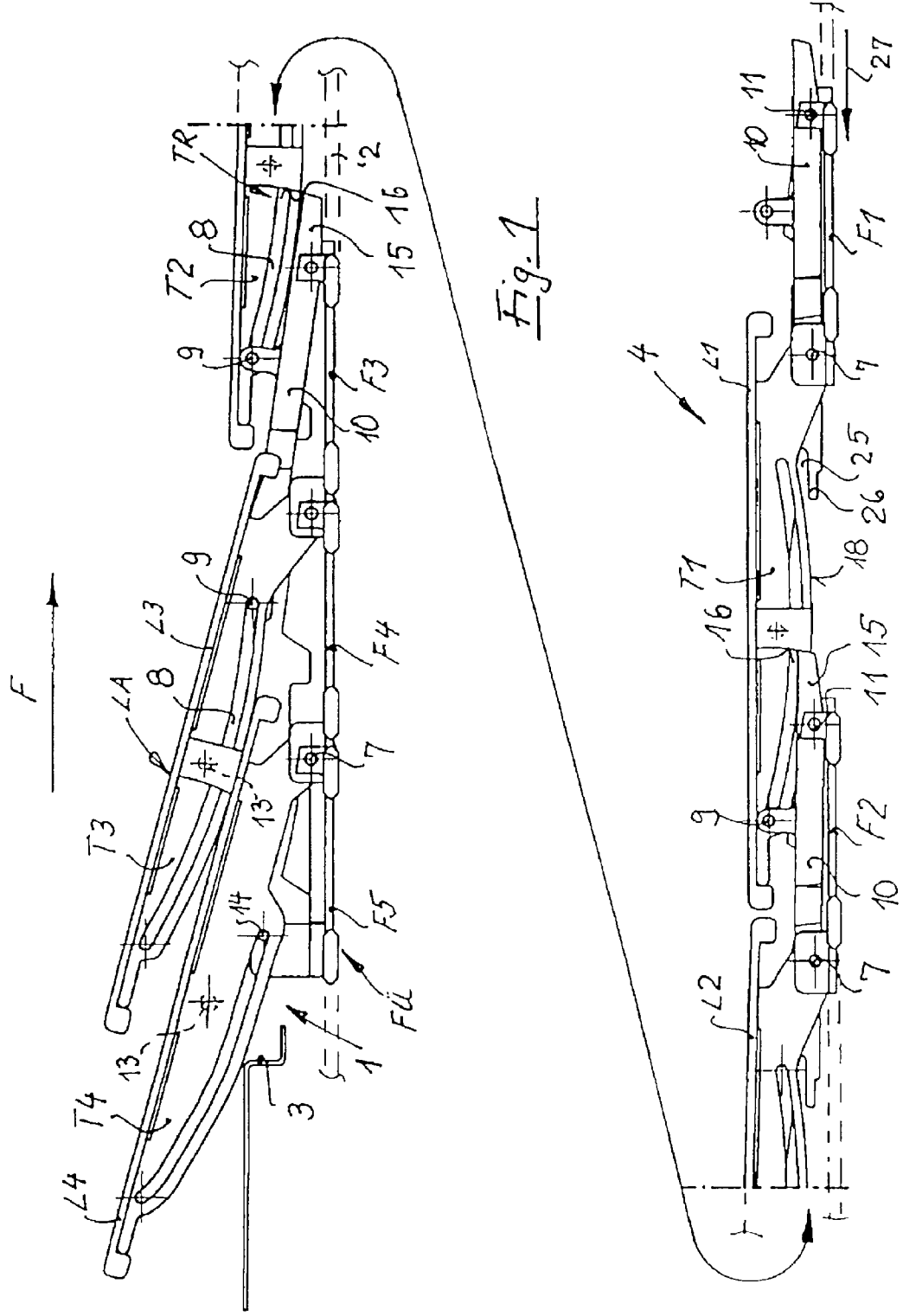
FIG. 1 shows a lamellar vehicle roof with lamellas which are supported in guide tracks disposed at opposite sides of a vehicle roof opening by guide carriages movable between a closed position in which the roof opening is covered and an open position in which the roof lamellas are tilted upwardly and moved to the back of the roof opening, where they are stacked on top of one another.

FIGS. 1 and 2 shows a lamellar vehicle roof according to the invention, partially opened that is moved toward the rear end of the roof opening 1 of the vehicle and supported in guide tracks 2 extending along the roof opening 1 up to the rear delimitation 3 of the roof opening 1. When the lamellar roof 4 is closed, the roof opening 1 is covered by the lamellas LA, specifically lamellas L1 to L4, which then form a closed sealed flat structure. In the partially open position as shown in FIGS. 1 and 2, the lamellas L2 to L4 are inclined upwardly and as shown for the lamellas L3 and L4 in an overlapping relationship. In this position, the lamellas have been moved in a direction opposite to the direction of the arrow F, which indicates the forward travel direction of the vehicle.

The lamellas L1 to L4 are supported on the vehicle body by way of the guide carriages FÜ, that is carriages F1 to F5. Each of the lamellas is supported on two guide carriages FU, for example, the lamella L1 is supported on the guide carriages F1 and F2 and the lamella L2 is supported on the guide carriages F2 and F3. Accordingly, adjacent lamellas such as L1 and L2 are supported at their interface area by the guide carriage F2.

The following description of the invention is directed mainly to the description of the guide structure arranged in the transition area between two adjacent lamellas LA, for example the guide carriage F2. The guide carriage F2 is connected to the lamella carriers T1 and T2.

Each of the lamellas L1 to L4 is pivotally supported on the guide carriage F1 to F4, which is in front, in the closing direction of the roof. The respective pivot axes are designated by the reference numeral 7 and are arranged—in the vehicle driving direction F—at the rear end of the respective guide carriages F1 to F4. The respective lamellas L1 to L4 are connected to the respective guide carriages F1 to F5 by way of the lamella carriers T1 to T4, which are provided with downwardly curved guide slots 8 into which guide pins 9 extend. Each guide pin 9 is mounted on a control rocker 10, which is supported on the guide carriage F1 to F4 disposed to the rear of the respective lamella. The control rocker 10 is supported by a pivot axis 11 which is stationary with respect to the particular guide carriage F1 to F4 and which is arranged at the front end of the guide carriage F2 to F3. The control rocker 10 however does not only support the support pin 9, which is guided in the guide grooves 8 of the lamella carrier T1–T3 which is in front of the control rocker 10. The control rocker 10 is also connected to the rear lamella L2 to L4 so as to be supported in the pivot direction of the lamella such that the control rocker 10 can pivot in accordance with the pivot movement of the respective lamella L1 to L4 out of its position flat with the roof structure to the upwardly tilted position.

Figure 11:
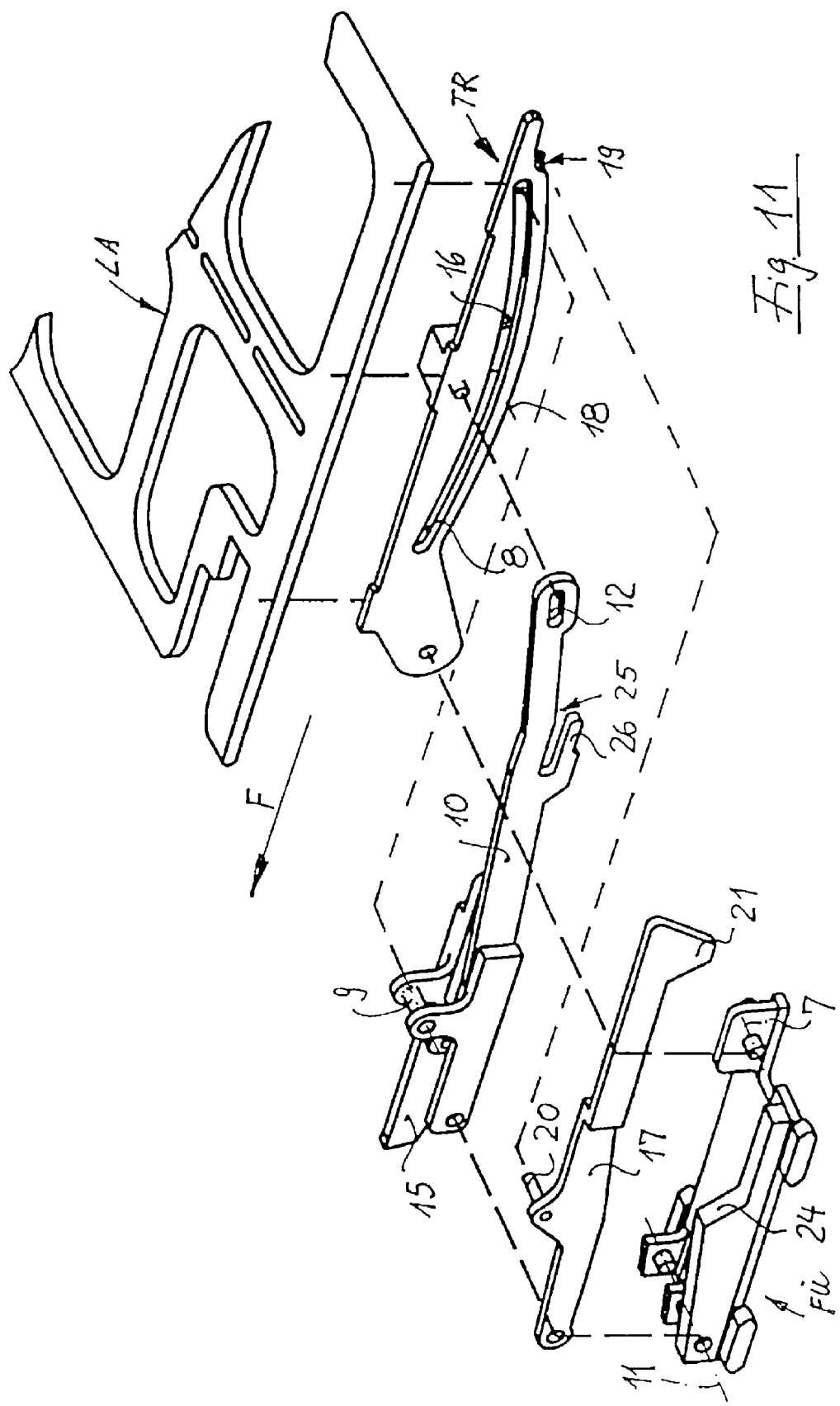
FIG. 11 shows schematically a guide carriage including the guide mechanism parts as shown in FIGS. 9 and 10.

The control rocker 10 is connected to the, based on the driving direction F of the vehicle, next rear lamella L1 to L4 by way of an elongated hole structure 12, in which a guide pin 13 is received that extends from the lamella carrier T1–T4 of the rear lamella L1–L4 as it is apparent particularly from FIGS. 9, 10, and 11.

With respect to the guide carriage F1, which is the—in driving direction—front most guide carriage and has, at its front end, no support structure for a front lamella, as the control rocker 10 has no guide function for a front lamella but it is kept the same anyway for other reasons which will be addressed later.

Also, the last lamella L4 is not guided by a control rocker 10, but a support pin 14 is provided which is stationary with respect to the guide carriage F5. The support pin 14 is so arranged that, in connection with a specially formed guide slot 8, it provides for the desired up-tilting movement of the last lamella L4, whenever the lamella arrangement is moved in the opening direction, that is opposite to the driving direction F, over the front guide carriage F1, which is provided with a drive that is not shown. The drive which acts on the first guide carriage F1, which may be a push type cable drive, is symbolized by the arrow 27.

The lamellas L1 to L4 are interlocked by way of the control rockers 10, which are supported by the guide carriages F2 to F5 until, by tilting the respective rear lamella, beginning with the lamella L4 and the control rocker 10 pivotally connected thereto, the lock of this control rocker 10 with the lamella L3 to L1 in front thereof or the lamella carrier T3 to T1 thereof is released. For the locking the control rocker 10 includes an end portion 15, which extends in travel direction F beyond its pivot axis 11 on the respective guide carriage F5-F2 and which overlaps a stop 16 of a lamella when the lamellar roof is closed. The stop 16 is for example a projection at a side of the respective lamella carrier T3 to T1 which, in adaptation to the end part 15 has a curved engagement track so that, in accordance with the angular position of the control rocker 10 with respect to the guide carriage F3 to F1, the thrust engagement is released during opening of the roof. Upon movement of the roof into the closed position, the control rocker 10 can pivot into an overlap position with the stop so that, upon further displacement of the lamellas L toward their closed position, a position is reached wherein thrust engagement is provided.

FIG. 2 complements FIG. 1 and the description provided in connection with FIG. 1 concerning the lamellar roof design with a view of the lamella guide structure as seen from the opposite side, that is from the outside of the vehicle. In this view, the locking elements 17 in the form of locking levers are visible. They are disposed in front of the control rockers 10, which are not shown in the FIG. 4 and which, in addition to the control rockers 10, are provided the guide carriages F2, F3 and F4 disposed between every two lamellas L1 and L2, L2 and L3, L3 and L4. By means of those locking elements 17, the guide carriages F2 and F3, F3 and F4 as well as F4 and F5 are interlocked when in the open position of the lamellar roof the carriages are moved into abutment with one another. The locking levers 17 have all about the same length as the control rockers 10. They extend toward the rear guide carriage F3 or, respectively, F4 and F5. The pivot axis of the locking levers 17 is disposed in the front area of the guide carriage and preferably co-axially with the pivot axis 11 of the control rocker 10 supported by the same guide carriage. As a result, only a single pivot shaft may be provided which is expedient from a manufacturing and tolerance point of view.

The locking levers 17 are each controlled by the lamellas L1–L3 or respectively, the lamella carriers T1–T3, disposed in front of the guide carriage supporting the respective locking lever 17. In the exemplary embodiment, the free edge of the lamella carrier T1 to T3 remote from the respective lamella forms an engagement edge 18, which extends essentially along the respective guide slot 8. The engagement edge 18 is disposed, adjacent to rear end area of the guide slot 8, in close proximity to the lamella and has a step 19 providing a stop for an engagement projection 20 of the locking lever 17.

In the example, the support projection 20 is in the form of a pin, which extends sidewardly from the locking lever 17 and below the respective lamella carrier T1 to T3. The step 19 forms a cam, which is inclined toward the respective lamella and therefore provides for a smooth transition to the engagement edge 18 in the area thereof extending along the guide slot 8.

At its free end remote from the pivot axis 11, the locking lever 17 is provided with a locking hook 21, to which a cam structure 22 on the guide carriage next in the direction opposite the travel direction F, is assigned which cam structure extends to an engagement recess 23. Also, the transition between the cam structure 22 and locking engagement recess 23 is smooth. The surface of the engagement recess 23 extends with respect to its side 24 adjacent the cam structure 22 at an obtuse angle.

Preferably, the locking lever 17 is spring-biased into engagement with the respective engagement edge 18 or, respectively, the engagement surface formed by the step 19. In this way, a stop is provided at the engagement edge 18 or the step 19 thereof with respect to the closed position of the roof 4 also for intermediate positions in the transition to the fully open position of the roof 4, wherein the locking lever 17 does not yet engage the support surface 22 of the in opening direction adjacent carriage. Depending on the spring force, support is also provided in the longitudinal direction of the vehicle in opposition to the force required for the opening of the lamellar roof when the support projection 20 abuts the step area 19. As a result, the control rocker 10 and the locking lever 17 have both support functions and complement each other. With the arrangement of the respective support surfaces and the timing obtained by the design conditions, a mutual load relief is achieved and excessively high edge stresses and the resulting wear can be avoided.

In the arrangement according to the invention, also unavoidable tolerances are relatively easily manageable since, with regard to each individual guide carriage FÜ, the lamella carrier LA, the locking lever 17 and the control rocker 10 are all supported directly on the guide carriage FÜ so that tolerances do not add up. The arrangement provides also for a compact design as far as the width is concerned. It has been found to be advantageous if the control rocker 10 supports the support pin 19 extending into the guide slot 8 at both sides since the guide stability is improved thereby. Accordingly, the stop 16 between the end part 15 of the control rocker 10 and the front most lamella LA is recessed at the side adjacent the respective lamella carrier TR in order to provide for the necessary passage clearance.

Particularly from FIGS. 11 and 12, it is apparent that the control rockers 10 are provided at their one end with the elongated opening 12, with a catcher opening 25 which is open toward the elongated opening 12 and which is delimited by a web 26 near the end of the control rocker and extends parallel to the lamella carrier TR. The control rocker supported on the guide carriage F4, that is, its support pin 9, has entered the front end position in the guide slot 8 of the lamella carrier when the control rocker 10 has reached its end position as shown in FIG. 1 for the guide carriages F3 and F4 and their respective guide mechanisms. As a result, in accordance with the upwardly tilted rear ends of the lamella carrier T3 and the lamella L3 in the open position thereof also the control rocker 10 is tilted upwardly which is supported on the guide carriage F3. The control rocker 10 is connected to the lamella L3 by way of the guide pin 13 which is shown in FIG. 1 only by dashed lines and which is received in the elongated hole 12 of the control rocker 10. In this position of the control rocker 10, the catcher opening 25 has reached the support pin 9 of the control rocker 10 of the guide carriage F4. The control rocker 10 is mostly not visible in FIG. 1 as it is covered by the lamella carrier T3. When support pin 9 has entered the catcher opening 25, an engagement is provided between the control rockers 10 of which one is supported on the guide carriage F3 and the other is supported on the guide carriage F4. The two control rockers together then form a support triangle arrangement whose base is formed by the guide carriages F3 and F4 and the support pin 9 forming the apex. The control rockers 10 are firmly engaged with one another so that a very stable support for the lamellas LA in their upwardly tilted position is achieved. This is necessary to provide for a vibration and rattle-free support of the lamella carrier TR when the roof is open.

FIG. 12, in which the same reference numerals are used, shows the stiffened lamella support structures wherein, with the roof open, the support levers in the form of control rockers 10 are interlocked and firmly engaged with one another for increased rigidity.

The guide structure according to the invention is suitable for lamella roof designs, in which the lamellas LA are joined with respect to each other and with respect to the roof opening 1 in a sealed manner, which is not shown in detail. However, the guide structure may also be used in connection with a roof design wherein the lamellas form only support structures for a roof cover material that is a roof skin. The roof skin is attached to the individual lamellas which define the pleat hoops. When the roof is open, the roof cover is raised and the pleats are formed by the raised hoops.

FIG. 2 shows schematically such a flexible roof cover 28 on top of the lamellas L1 to L4, the flexible roof cover 28 being indicated by a dashed line. The flexible roof cover is also shown in FIG. 12.

FIG. 11 shows that the lamellas LA form only a support structure if they are covered by a roof cover 28. The lamellas may therefore be provided with cut-outs to save weight. With such a design, a support of the lamellas by guide rockers 10 which keep the cover under tension is particularly advantageous since fluttering of the flexible roof cover 28 as a result of the wind forces can then be avoided. The lamella structure with cut-outs for the support of the flexible roof cover, which is partially firmly cemented to the lamella structure, is expedient also for the formation of the pleats upon opening of the roof since in this way in certain areas an increased pleat space can be provided as it is shown in FIG. 12.

What is claimed is:

1. A lamellar roof for a roof opening (1) of a vehicle, comprising at least front and rear lamellar roof sections (L1–L4) supported in said roof opening by tracks so as to be movable between a closed position, in which the roof opening (1) is closed by a planar side-by-side arrangement of said lamellas (L1–L4) and an open position, in which the lamellas (L1–L4) are tilted upwardly and moved backwardly into overlapping relationship, a lamella guide mechanism (6) for guiding said lamellas during movement between their open and closed positions and including guide carriages (F1–F5) movably supported on said tracks, lamella carriers (T1–T4) supported on said guide carriages (F1–F5) together with control rockers (10), each of said guide carriages (F1–F5) being provided with one of said lamella carriers (T1–T4) and one of said control rockers (10), said control rockers (10) of adjacent guide carriages (F1–F5) being firmly engaged with one another when said roof is open and said guide carriages (F1–F5) are moved into an abutting relationship, each control rocker (10) being joined to the, in travel direction of the vehicle, adjacent front lamella (L1) by way of a guide slot (8) extending along the lamella carrier (T1) thereof and supporting said adjacent front lamella (L1).

2. A lamellar roof according to claim 1, wherein said control rocker (10) is supported on a guide carriage (F2) so as to be pivotable about a pivot axis (11) and the adjacent rear lamella (L2) is supported on the same guide carriage (F2) pivotally about a lamella carrier axes (7) which is spaced in the vehicle travel direction (F) rearwardly from said control rocker pivot axis (11).

3. A lamellar roof according to claim 1, said control rocker (10) and said lamella carrier (T1) for a respective lamella (L1), which are both supported by the same guide carriage (F1), extend in the same direction.

4. A lamellar roof according to claim 1, wherein, in the open position of the roof (4), adjacent lamellas (L1–L4) and the control rockers (10) of adjacent guide carriages (F1–F5) are disposed in overlapping relationship and are firmly engaged with each other in the overlapping areas thereof.

5. A lamellar roof according to claim 1, wherein the mutual engagement of the control rockers (10) occurs in the area of the control rocker engagement of the rear guide carriage with the guide groove (8) of the front lamella (L1).

6. A lamellar roof according to claim 5, wherein the mutual engagement area of the control rockers (10) coincides with the control rocker support area of the rear guide carriage with the guide groove 8 of the front lamellas (L1).

7. A lamellar roof according to claim 1, wherein the control rocker (10) supporting the respective adjacent front lamella (L1) is disposed in the open position of the lamellar roof in an overlapping position with the control rocker (10) of the next control rocker in opening direction of the roof.

8. A lamellar roof according to claim 7, wherein the part of the control rocker (10) which is engaged by the—in closing direction—preceding control rocker (10) when the roof is open is formed by the part extending into the guide slot (8) of the lamella (L1) disposed between these control rockers (10).

9. A lamellar roof according to claim 1, wherein a locking lever (17) is provided by which adjacent guide carriages (F1–F5) are interlocked when they are in overlapping position relative to each other and which supports the—in travel direction (F)—front lamella (L1) by way of a guide edge (18) and which has a locking hook (21) for reception in an engagement recess (23) of the—in opening direction of the roof—following guide carriage.

\* \* \* \* \*